April 14, 1942.     C. N. SKINNER     2,279,351
PARTIAL DENTURE
Filed Jan. 17, 1941     2 Sheets-Sheet 1

INVENTOR.
C. N. Skinner.
BY

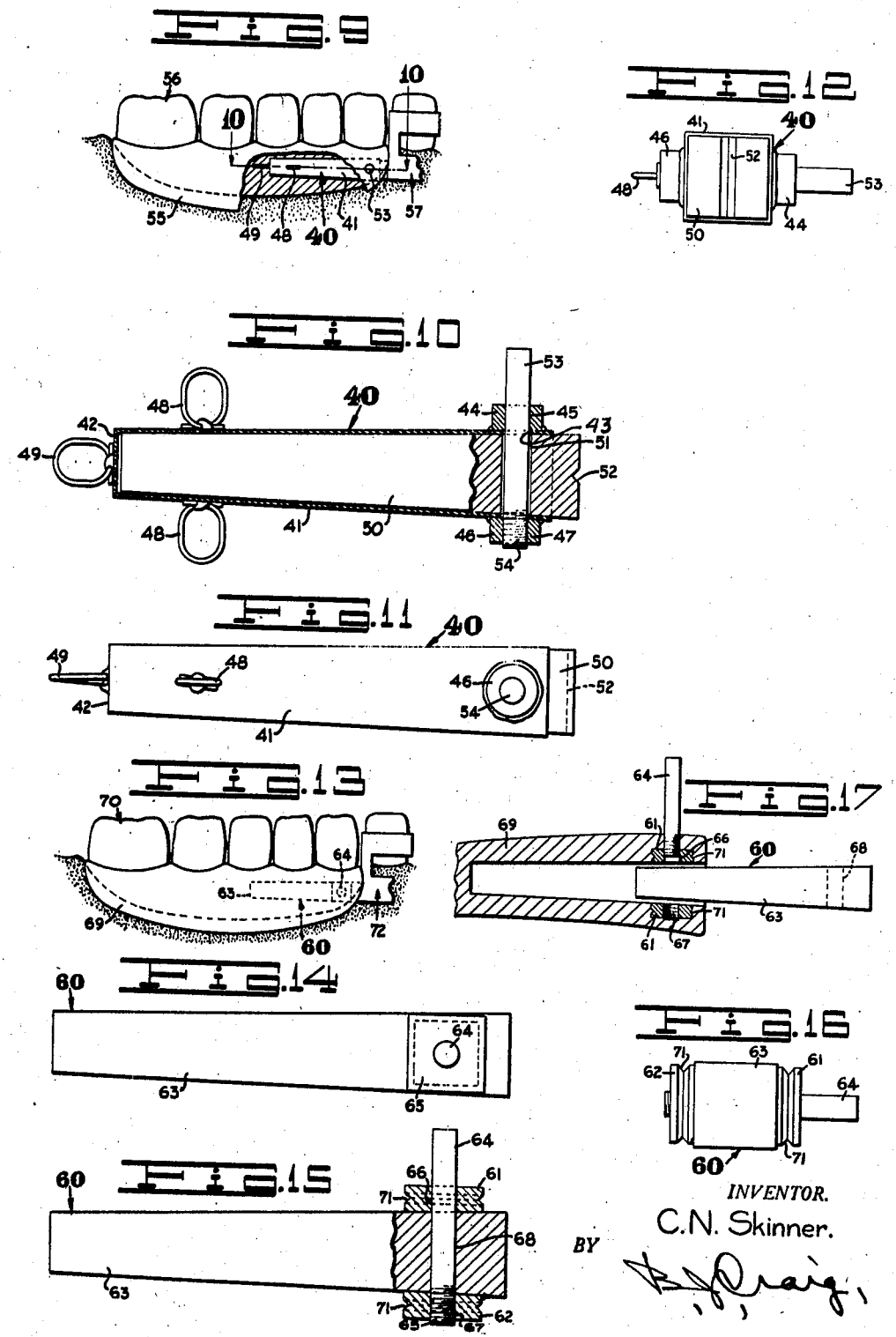

Patented Apr. 14, 1942

2,279,351

UNITED STATES PATENT OFFICE 2,279,351

PARTIAL DENTURE

Clawson N. Skinner, Whittier, Calif.

Application January 17, 1941, Serial No. 374,848

8 Claims. (Cl. 32—5)

This invention relates to improvements in partial dentures.

The general object of the invention is to provide an improved means for connecting a partial denture saddle to an anchoring means.

Another object of the invention is to provide a novel, detachable means for connecting a partial denture saddle to a securing means.

A further object of the invention is to provide novel means for connecting a partial denture saddle to an anchoring means in such manner as to provide restricted universal movement of the denture saddle.

Other objects and the advantages of this invention will be apparent from the following description taken in connection with the accompanying drawings wherein:

Fig. 9 is a view similar to Fig. 4 showing a modified form of connector member.

Fig. 10 is an enlarged section through the modified form of connector member taken on line 10—10 of Fig. 9.

Fig. 11 is a side elevation of the device shown in Fig. 10.

Fig. 12 is an end view of the device as shown in Fig. 11.

Fig. 13 is a side view of a partial denture embodying a further modified form of my invention.

Fig. 14 is an enlarged side elevation of the modified connector member shown in Fig. 13.

Fig. 15 is a top plan view partly in section of the device shown in Fig. 14.

Fig. 16 is an end view of the device as shown in Fig. 14, and

Fig. 17 is a section through the denture base showing the pin and bar member partly removed therefrom.

Figure 1:
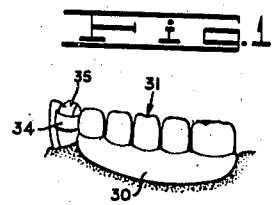
Fig. 1 is a side view of a partal denture embodying the features of my invention and showing it anchored to abutment teeth.
Figure 2:
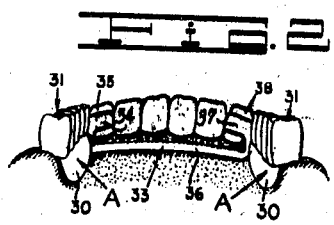
Fig. 2 is a view of the device shown in Fig. 1 looking toward the front of the mouth.
Figure 4:
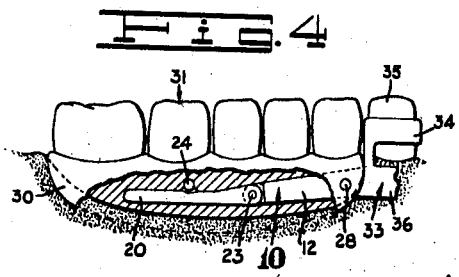
Fig. 4 is an enlarged side view, partly in sectinon, of the denture shown in Fig. 1.
Figure 3:
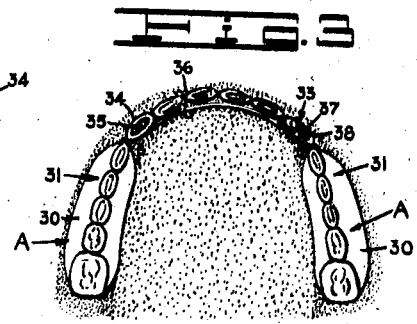
Fig. 3 is a top plan view of the device shown in Fig. 1.
Figures 5, 7:
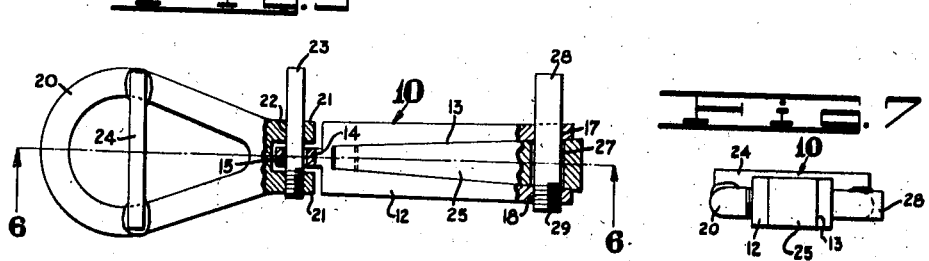
Fig. 5 is an enlarged top plan view partly in section, showing my improved connector device.
Fig. 7 is an end view of the connector member.
Figure 6:
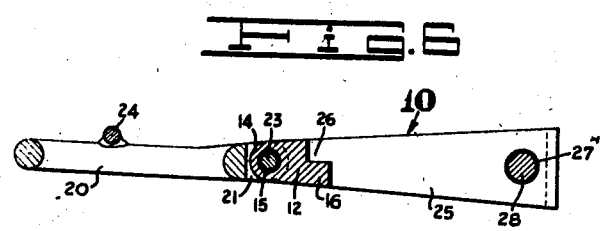
Fig. 6 is a section taken in line 6—6 of Fig. 5.

Referring to the drawings by reference characters, I have indicated my improved connector device generally at 10. As shown the device consists of two saddles A secured on opposite sides of the jaw. In the following description, however, I will describe but one of the saddles A as both may be alike in construction. As shown, the construction includes an elongated body portion 12 having a slot 13 therein, opening through the top, bottom and through one end thereof. The sides of the body 12 are convergingly tapered towards the closed end of the slot, and the body includes a reduced end tongue 14 having an aperture 15 therein.

The slot 13 also convergingly tapers from the open end thereof towards the opposite end where the body includes a step portion 16, which extends across the slot adjacent the bottom thereof. Adjacent the open end of the slot 13, one side of the body has an aperture 17 therein and the opposite side of the body has an aligned threaded aperture 18 therein.

Connected to the body 12 I provide a link member 20 which, at one end, includes a pair of spaced lugs 21 each having an aperture 22 therein in which a pin 23 is positioned. The tongue 14 of the body 12 is positioned between the link lugs 21 and the pin 23 is positioned in the aperture 15 of the tongue.

The aperture 15 in the tongue 14 is preferably of a greater diameter than the pin 23, to allow angular movement of the link 20 as well as pivotal movement. Intermediate the length thereof, the link 20 has a transverse bar 24 thereon which may be soldered thereto.

The device 10 further includes a bar member 25 which is adapted to be positioned in the body slot 13 and, like the slot, has sides which taper towards one end where a lip portions 26 is provided. This lip portion is adapted to overlap the step portion 16 of the body. Adjacent the end thereof opposite the lip 26 the bar has a transverse aperture 27 therethrough.

The body 12 and the bar 25 are adapted to be connected by a pin 28 which, adjacent one end, includes a threaded portion 29. The pin 28 is positioned in the aperture 17 of the body and in the bar aperture 27 and the threaded portion 29 thereof is positioned in the threaded body aperture 18. The device 10 is adapted to be moulded within a plastic denture base or saddle 30 or attached to a metal saddle.

Figure 8:
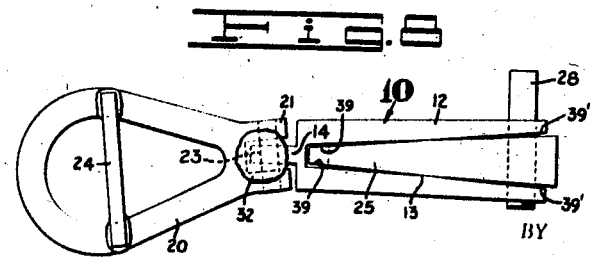
Fig. 8 is a top plan view of the connector member showing it in an adjusted and sealed position.

The saddle area varies with each individual, therefore the relative positions of the body 12 and the link 20 must vary to coincide with the circumstances. Accordingly, before the device is arranged in the denture base it is positioned at the most convenient relationship and a drop of solder 32 is placed over the body tongue 14 and link lugs 21 to retain the two in the adjusted position. The ends of the pin may then be cut off as shown in Fig. 8.

The device 10 is then placed in the correct position in the denture area so that the large end of the bar 25 will be substantially flush with the end of the finished base when the denture is processed. After the denture 31 is processed, pin 28 may be removed thereby allowing the bar 25 to be removed from the body 12.

Before or after the denture is processed the end of the bar 25 is adapted to be secured as by soldering to a suitable anchoring device such as indicated at 33 which, in this instance, is shown as including an anchor band 34 adapted to be secured to or surround a tooth 35 adjacent the denture and connected by a bar 36 to another band 37 adapted to be secured to or surround a tooth 38 spaced therefrom from the tooth 35.

After the bar 25 is secured to the anchor member 33, the bar 25 is positioned in the body aperture 13 and retained in position by the pin 28. If when the device is placed in a patient's mouth and it is found desirable to allow a slight movement of the denture 31 the device is removed and portions of the sides of the bar 25 relieved, as at 39, or portions of the sides of the body aperture relieved, as at 39'. By thus relieving portions of the device 10, the device may be more comfortably fitted to a patient. After correct adjustment of the device is made, the pin 28 is severed flush with the sides of the denture base 30.

In Fig. 9 I have indicated a modified form of my invention generally at 40. As shown, the device 40 includes an elongated, hollow, thin metal housing 41 closed at one end as at 42 and convergingly tapered from the open end towards the closed end. Adjacent the open end the housing has a pair of opposed apertures 43 in the side walls thereof and exterior thereto on one side the housing has a washer member 44 soldered thereto which has an aperture 45 therein coaxial with the housing apertures 43. Opposite the washer 44 the housing has a similar washer 46 soldered thereto which has a threaded aperture 47 therein co-axial with the housing apertures 43. Wire loops 48 are soldered to the sides of the housing and the closed end 42 has a wire loop 49 soldered thereto.

The device 40 further includes a bar member 50 which is tapered to conform to the shape of the housing 41 in which it is adapted to be positioned. Adjacent the large end thereof the bar 50 has a transverse aperture 51 therein and in the face of the large end it has a groove 52 therein.

To form a denture using the device 40 the bar 50 is positioned in the housing 41 and connected thereto by a pin 53 having a threaded portion 54 adjacent one end thereof. The pin 53 is positioned in the housing washer aperture 45, in the housing apertures 43 and in the bar aperture 51 with the threaded portion positioned in the threaded aperture 47 of the housing washer 46.

The assembled device 40 is then correctly positioned in the denture base area and the base 55 of a denture plate 56 is cast around the device 40, leaving the large end of the bar 50 substantially flush with the end of the finished base. Before or after the denture plate 56 is processed, the large end of the bar 50 is soldered to a suitable anchor band such as indicated at 57. The groove 52 provides a channelway for the solder to flow into when the bar is being secured to the anchor band. The bar 50 may be relieved at various places as previously described in connection with the bar 25 to allow slight restricted universal movement between it and the housing 41, to provide a more comfortable fit. In Fig. 13 I have indicated a further modified form of my invention generally at 60. As shown the device 60 includes a pair of polygonal washer members 61 and 62, a bar member 63 and a connector pin 64 which includes a threaded portion 65 adjacent one end. The washer 61 has an aperture 66 therethrough and the washer 62 has a threaded aperture 67 therethrough.

The bar 63 is preferably convergingly tapered towards one end and adjacent the small end has a transverse aperture 68 therethrough.

To form a denture plate using the device 60 the apertures of the washers 61 and 62 are aligned with the bar aperture 68 and the pin 64 is positioned in the aperture 66 of the washer 61 and in the bar aperture 68 with the threaded portion thereof positioned in the threaded aperture 67 of the washer 62. The washers 61 and 62 are placed against the sides of the bar 63 and the entire device 60 correctly positioned in the denture base area. Thereafter the base 69 of a denture plate 70 is processed encasing the device 60 and leaving the end of the bar 63 substantially flush with the end of the base 69.

Each of the washers 61 and 62 preferably have a peripheral groove 71 therein to receive the base material to prevent accidental movement of the washers.

Before or after the denture 60 is processed the bar 63, like the bars 25 and 50, is secured to a suitable anchor. After the denture 70 is formed, the pin 64 may be removed, allowing removal of the bar 63. The bar 63 is then again positioned in the denture plate 70 and secured in position by the pin 64 which is then severed flush with the surface of the denture plate base.

From the foregoing description it will be apparent that I have provided a novel partial denture connector device which is simple and is so constructed that it has a desired slight restricted universal movement to facilitate adjustment and to provide comfort for the wearer.

I claim:

1. In an achor device for a partial denture, an elongated bar member, having one end adapted to be secured to an anchor, a body mounted on said bar, said bar being of a size to permit the body to move slightly thereon, a denture casting engaging member and means on the body to loosely and pivotally mount the engaging member on the body.

2. In an anchor device for a partial denture, a bar member adapted to be secured to an anchor, a body having a slot receiving said bar, said bar being of a size to permit the body to move slightly thereon, means to prevent removal of the bar from the body, a link and means on the end of said body remote from said preventing means to loosely and pivotally mount the link on the body.

3. In an anchor device for a partial denture, an elongated bar member adapted to be secured to an anchor, a body having a slot receiving said bar member, said body and bar having complemental engaging faces, a pin passing through one end of said body and bar to hold the parts assembled, said body having a tongue thereon, a link having spaced lugs disposed about the tongue, and a pin passing through said lugs and said tongue to pivot the link on the body.

4. In an anchor device for a partial denture, a bar member adapted to be secured to an anchor, said bar member having plane faces tapering from the anchor device, a body having an open ended slot therein receiving said bar, said slot having side walls complemental to said bar, said body and bar having aligned openings, a pin passing through said openings, said pin loosely fitting said bar aperture whereby the body has slight universal motion about the bar, said body having a tongue thereon remote from the pin, an open link having spaced projecting lugs at one end receiving said tongue, said lugs and said tongue having aligned apertures, a second pin passing through said last mentioned apertures, said pin loosely engaging the tongue apertures, whereby the link has limited motion relative to the body, means to limit the movement of the link about the second pin, and a partial denture casting engaging said link and said body.

5. In an anchor device for a partial denture, a bar member adapted to be secured to an anchor, said bar member having plane outer faces tapering forwardly from the anchor device, a body having an open ended slot therein, said slot having side walls converging from the open end and complemental to said bar, said bar being positioned in said slot, said body and bar having aligned openings, a pin passing through said openings, said pin loosely fitting said bar aperture whereby the body has slight universal motion about the bar, said body having a tongue thereon, remote from the pin, an open link having spaced projecting lugs at one end receiving said tongue, said lugs and said tongue having aligned apertures, a second pin passing through said last mentioned apertures, said pin loosely engaging the tongue apertures, whereby the link has limited motion relative to the body, means to limit the movement of said link about said second pin and a partial denture casting engaging said link and said body.

6. In an anchor device for a partial denture, a bar member adapted to be secured to an anchor, said bar member having plane outer faces, said faces being rectangular in cross section and tapering from the anchor, a body having an open ended slot therein, said slot having side walls converging from the open end and complemental to said bar, said bar being positioned in said slot, said body and bar having aligned openings, a pin passing through said openings, said pin including a threaded portion and one of said body apertures being threaded to receive the pin, said pin loosely fitting in said bar aperture whereby the body has slight universal motion about the bar, said body having a tongue thereon, remote from said pin and including a step adjacent said tongue, an open link having projecting lugs at one end, said lugs being spaced apart and receiving said tongue, said lugs and said tongue having aligned apertures, a pin passing through said last mentioned apertures, said pin tightly engaging the lug apertures and loosely engaging the tongue apertures, whereby the link has limited motion relative to the body, said link having a lip engaging said step, a bar across said link and a partial denture casting engaging said link and said body.

7. In an anchor for a partial denture, an elongated tapering bar member having plane faces, an anchor secured to said bar member, said bar member having aligned washer members secured thereto, said bar having an aperture aligned with the washer apertures and a pin passing through the washers and extending through the bar.

8. In an anchor for a partial denture, an elongated tapering bar member having plane faces, an anchor secured to said bar member, said bar member having washer members secured on opposed sides thereof, each of said washer members having a peripheral grove therein, said bar having an aperture aligned with the washer apertures, one of said washers being internally threaded, and a pin having a threaded end portion engaging the threaded end of the washer and extending through the bar and the other washer.

CLAWSON N. SKINNER.